Figure 1:
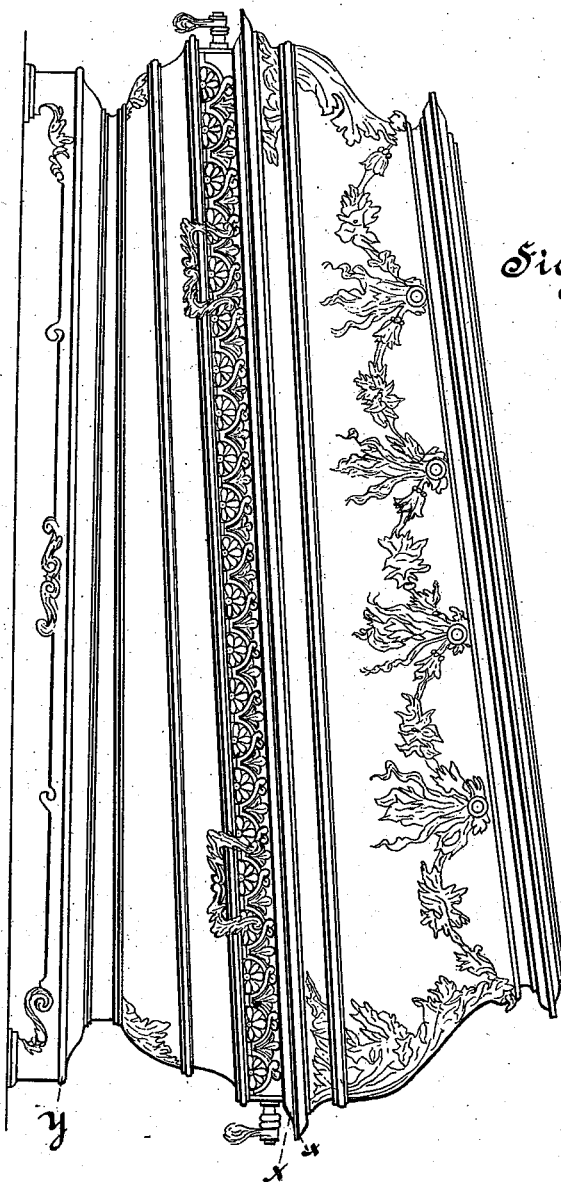

(No Model.)　　　　　　　　　　　　　　　　　　2 Sheets—Sheet 1.

L. MUNDT.
MANUFACTURE OF ARTIFICIAL STONE COFFINS.

No. 382,824.　　　　　　　　　Patented May 15, 1888.

(No Model.) 2 Sheets—Sheet 2.
L. MUNDT.
MANUFACTURE OF ARTIFICIAL STONE COFFINS.
No. 382,824. Patented May 15, 1888.
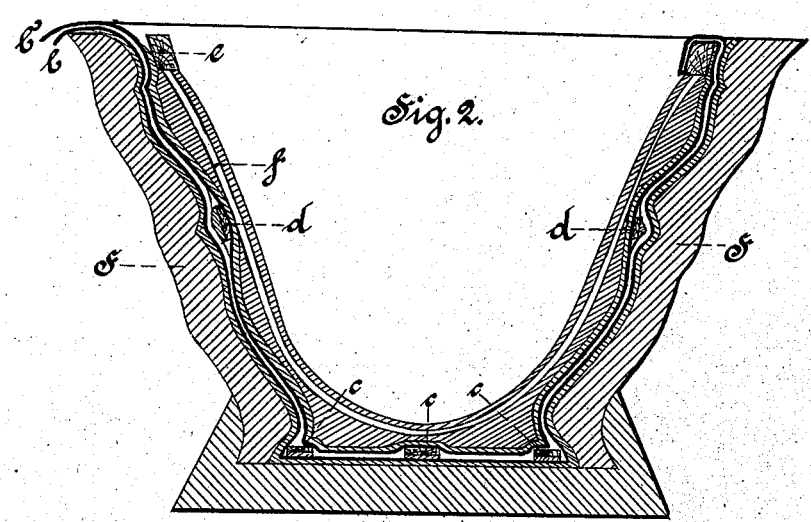
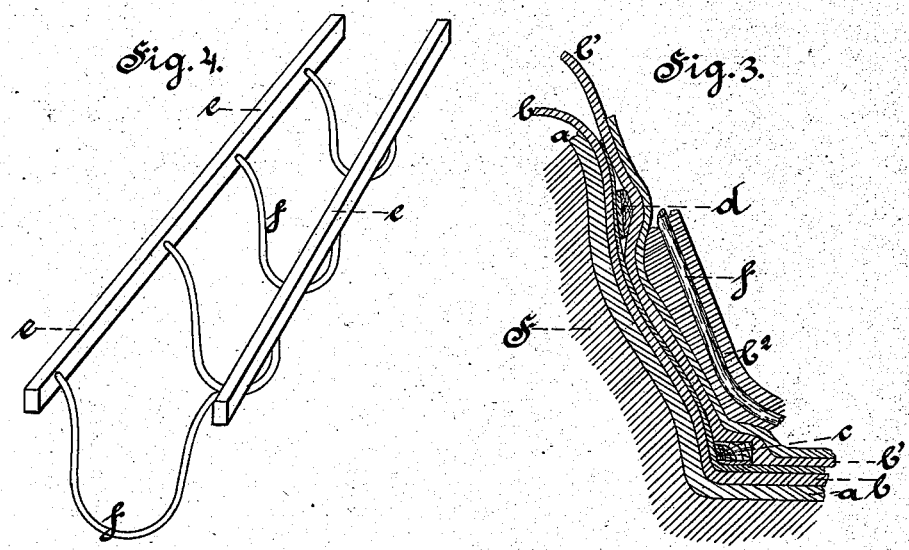
Witnesses,
W. Bindewald.
W. Schwiethal.
Inventor,
Lebrecht Mundt.
by H. Wrater
Att'ies.

UNITED STATES PATENT OFFICE.

LEBRECHT MUNDT, OF BERLIN, GERMANY.

MANUFACTURE OF ARTIFICIAL-STONE COFFINS.

SPECIFICATION forming part of Letters Patent No. 382,824, dated May 15, 1888.

Application filed November 12, 1886. Serial No. 218,738. (No model.)

*To all whom it may concern:*

Be it known that I, LEBRECHT MUNDT, of Berlin, in the Kingdom of Prussia and German Empire, have invented new and useful Improvements in Manufacturing Stone Coffins out of Artificial Material, of which the following is a specification, reference being had therein to the accompanying drawings, no patents being obtained by me anywhere for this invention until now.

This invention relates to improvements in manufacturing stone coffins out of artificial material, which is strengthened by inclosing linen and skeleton of wood and wire.

Figure 1 represents the coffin ready-made. Fig. 2 is a vertical cross-cut. Fig. 3 is a partial cross-cut of the coffin while it is worked. Fig. 4 is the skeleton or frame of the coffin.

I use for making the above-named coffins a substance composed as follows: First, a powder composition of two hundred parts of burnt gypsum, and five parts of oxide of iron; second, a fluid consisting of seventy-five parts of water, eight parts of glycerine, ten parts of dextrine, and one part of alum, one part of dissolved glue.

The above-named powder composition is stirred up well with this fluid and then used in the following manner: The molds to be used, each of which represents either an upper or an under part of a coffin, are prepared in the way required. The coagulated thick fluid substance is then applied in the thickness desired, either by hand or with a brush, to the sides of the mold F. When that is done, large strips of linen texture are taken and worked into the substance in such a way that one strip of the linen always overlaps the other on all sides and in such a way that the upper strips, $b\ b'$, reach about twenty centimeters beyond the edge of the mold. After that the wood laths $d$ and $c$, which are first impregnated with the fluid described above, are rubbed hard with the dry substance and put to the respective places. Another layer of the substance is then applied, and strips of linen are again worked into the material in the way described. When that is done, the skeleton or frame, which is represented in Fig. 4, and consists of bands $e\ e$ and wires $f\ f$, (the latter are bored through $e\ e$,) is laid into the mold. The bands $e\ e$ are pressed with the substance hard against the sides that have been made, and the overreaching strips of linen $b\ b'$ are laid round the bands, together with the substance. The irons $ff$ are bedded with the substance and the linen strips in the sides of the coffin. When the whole has stiffened, the mold is removed. The fitting-bands, which are necessary to make the coffin close exactly, (see Fig. 1, $x$ and $y$,) are made with the substance, and are fastened by means of nails to the bands $e$. The bottom bands, to which the feet of the coffin are fastened, are nailed onto bands $c\ c$. The handles for carrying the coffin are fastened by means of cramps through the bands $e$. The parts thus made are then placed in the drying-room to dry, the temperature being kept up to about 50° Celsius. After drying, the parts are dipped in a varnish-bath, which makes the substance able to resist moisture well. A mixture of chalk, glue, and Venetian turpentine is then applied and rubbed on with a stone to polish the outside of the coffin and give it a finer appearance. Color of any kind can then be laid on; or the coffin can be bronzed or polished, as may be desired. The article thus made is, owing to its proportionally small weight, (in consequence of the thin sides,) easy to transport, is quite infrangible and water-tight, can be closed hermetically, and when proper molds are used has a really artistic appearance, and is very cheap.

What I claim, and desire to secure by Letters Patent of the United States, is—

The construction of coffins in the mold F, consisting of a substance composed of gypsum, oxide of iron, glycerine, dextrine, alum, glue, and water, in combination with linen strips $b\ b'$ and wood laths $c\ d$, and a wire skeleton or frame, $e\ f\ f\ e$, substantially as described.

In witness whereof I have hereunto set my hand in presence of two witnesses.

LEBRECHT MUNDT.

Witnesses:
 HANS BRACKEBUSCH,
 B. ROI.